United States Patent [19]

Townsley et al.

[11] Patent Number: 5,758,098

[45] Date of Patent: May 26, 1998

[54] METHOD AND APPARATUS FOR PROVIDING A HIGH THROUGHPUT TWO-CONDUCTOR SERIAL INTERFACE WITH SUPPORT FOR SLAVE DEVICE DETECTION

[75] Inventors: David B. Townsley; Andrew Gong, both of Cupertino, Calif.

[73] Assignee: Apple Computer, Inc., Cupertino, Calif.

[21] Appl. No.: 241,738

[22] Filed: May 12, 1994

[51] Int. Cl.[6] .................................................. G06F 13/00
[52] U.S. Cl. .................................... 395/282; 395/290
[58] Field of Search .............................. 395/325, 250, 395/800, 282, 283, 290; 371/15.1; 439/41

[56] References Cited

U.S. PATENT DOCUMENTS

| | | | |
|---|---|---|---|
| 4,034,346 | 7/1977 | Hostein | 395/325 |
| 4,608,700 | 8/1986 | Kirtley, Jr. et al. | 395/325 |
| 4,697,858 | 10/1987 | Balakrishnan | 439/61 |
| 5,123,092 | 6/1992 | Buxton et al. | 395/250 |
| 5,146,567 | 9/1992 | Kao | 395/325 |
| 5,157,771 | 10/1992 | Losi et al. | 395/325 |
| 5,187,794 | 2/1993 | Hall | 395/800 |
| 5,237,322 | 8/1993 | Heberle | 340/870 |
| 5,237,609 | 8/1993 | Kimura | 380/3 |
| 5,317,697 | 5/1994 | Husak et al. | 395/325 |
| 5,357,519 | 10/1994 | Martin et al. | 371/15.1 |
| 5,399,848 | 3/1995 | Kimura | 235/492 |
| 5,428,752 | 6/1995 | Goren et al. | 395/325 |

OTHER PUBLICATIONS

"Digital Bus Handbook", Joseph Di Giacomo, 1990, pp. 14.2–14.5.
Motorola, MC68HC705P9 Techincal Data, 1991, Section 7 Serial I/O Port, pp. 7-1-7-6.
Motorola Semiconductor Technical Data, "8-Bit Microcomputers MC68HC05C4, et al.", 1985, pp. 2-1-2-5 & 6-1-6-12.
Naji Naufel, Motorola 8-Bit MCU Applications Manual AN1066, "Interfacing the MC68HC05C5 SIOP to an I²C Peripheral", 1992, pp. 567-574.
Motorola, MC68HC05P6 Technical Data, Dec. 1992, Section 1 General Description, pp. 1-1-1-4, Section 9 Serial I/O Port (SIOP), pp. 9-1-9-6.
Richard Soja, Motorola 8-Bit MCU Applications Manual, ANE405, "Bi-directional Data Transfer between MC68HC11 and MC6805L3 using SPI", 1992, pp. 649-653.

Primary Examiner—Jack B. Harvey
Assistant Examiner—David A. Wiley
Attorney, Agent, or Firm—Blakely, Sokoloff, Taylor & Zafman

[57] ABSTRACT

A master agent and a slave agent are interconnected over a two-conductor bus system. One conductor is utilized to transfer data signals between the agents and the second conductor is utilized to transfer a clock signal between the agents. The master agent includes a single data port for both input and output. The slave agent includes two data ports: an input port and an output port. The input port and the output port are coupled to a single conductor, thereby allowing data to be input to and output from the slave agent on a single line. An open collector device is situated between the output port of the slave agent and the data conductor. Data is transferred between the master and slave agents by first synchronizing the agents. The agents are synchronized by first allowing the data conductor to obtain a high state. Upon sensing the data conductor high, the master agent drives the clock conductor to a low state. The slave agent responds by driving the data conductor low if the agent is ready for a transfer. The master agent then drives the clock conductor high in response to the slave agent driving the data conductor low. The slave agent then drives the data conductor high, and prepares for the data transfer.

27 Claims, 11 Drawing Sheets

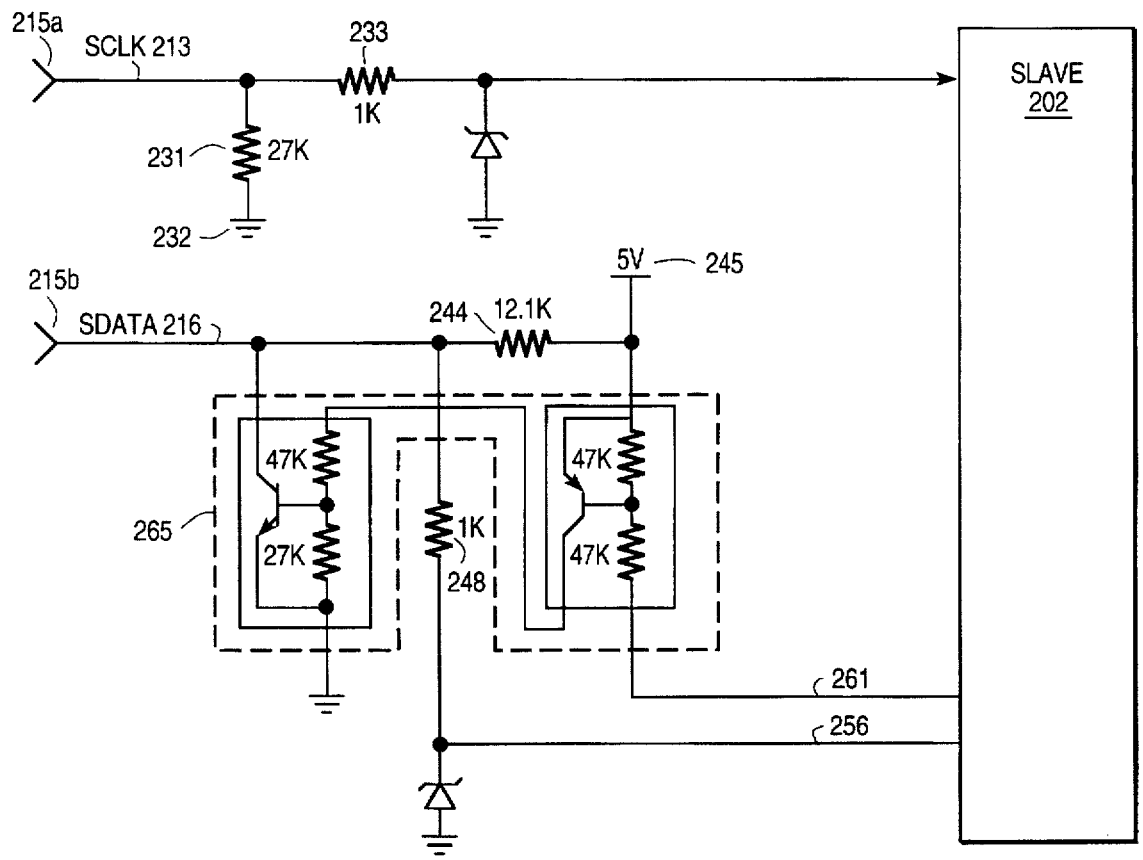
FIG_2B
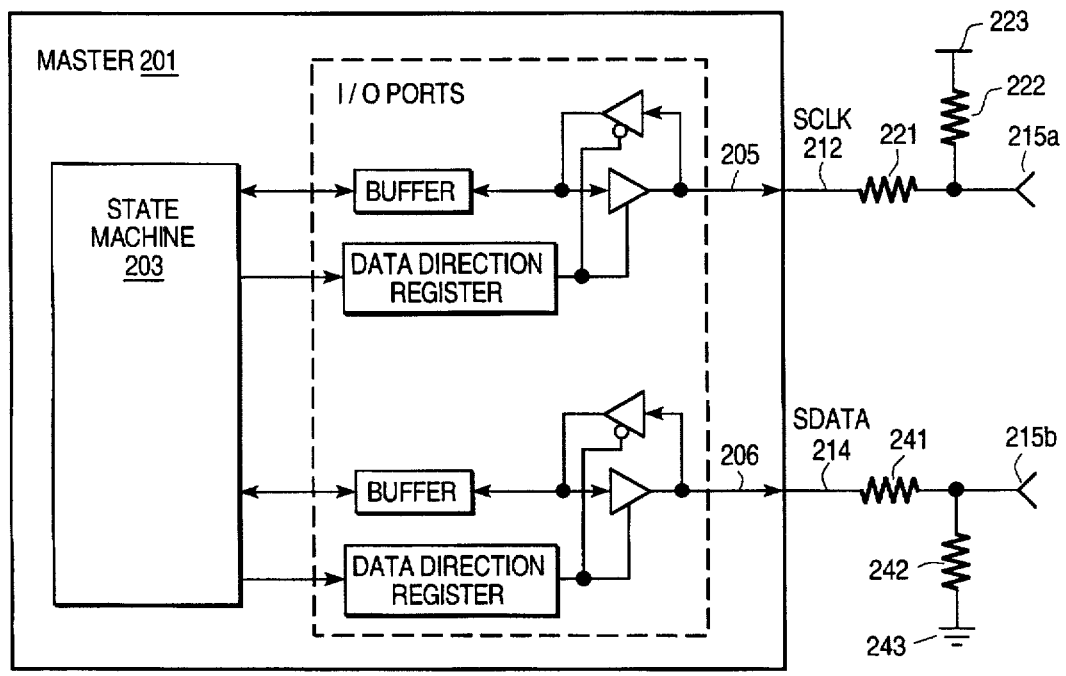
FIG_2C

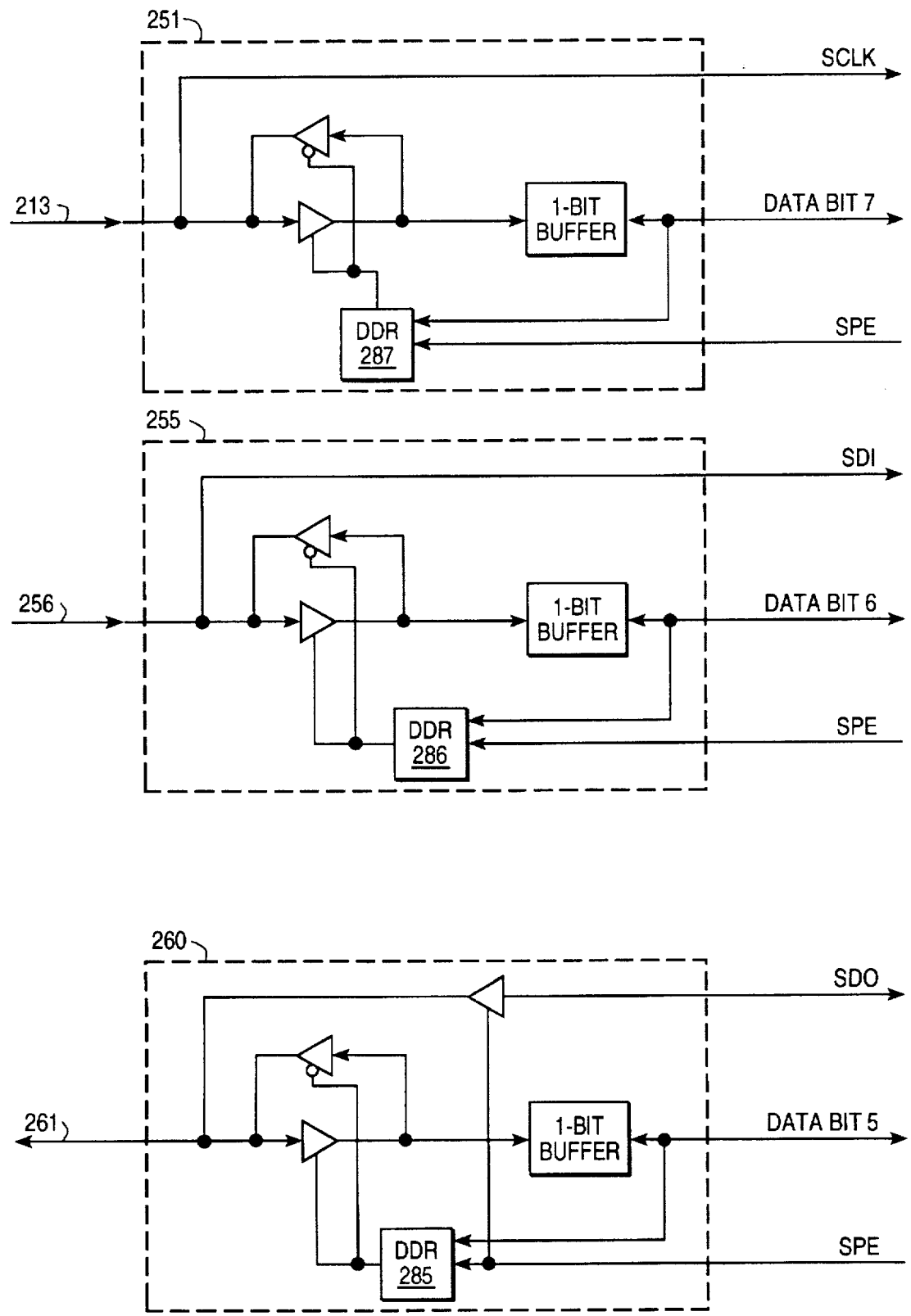
FIG_2E

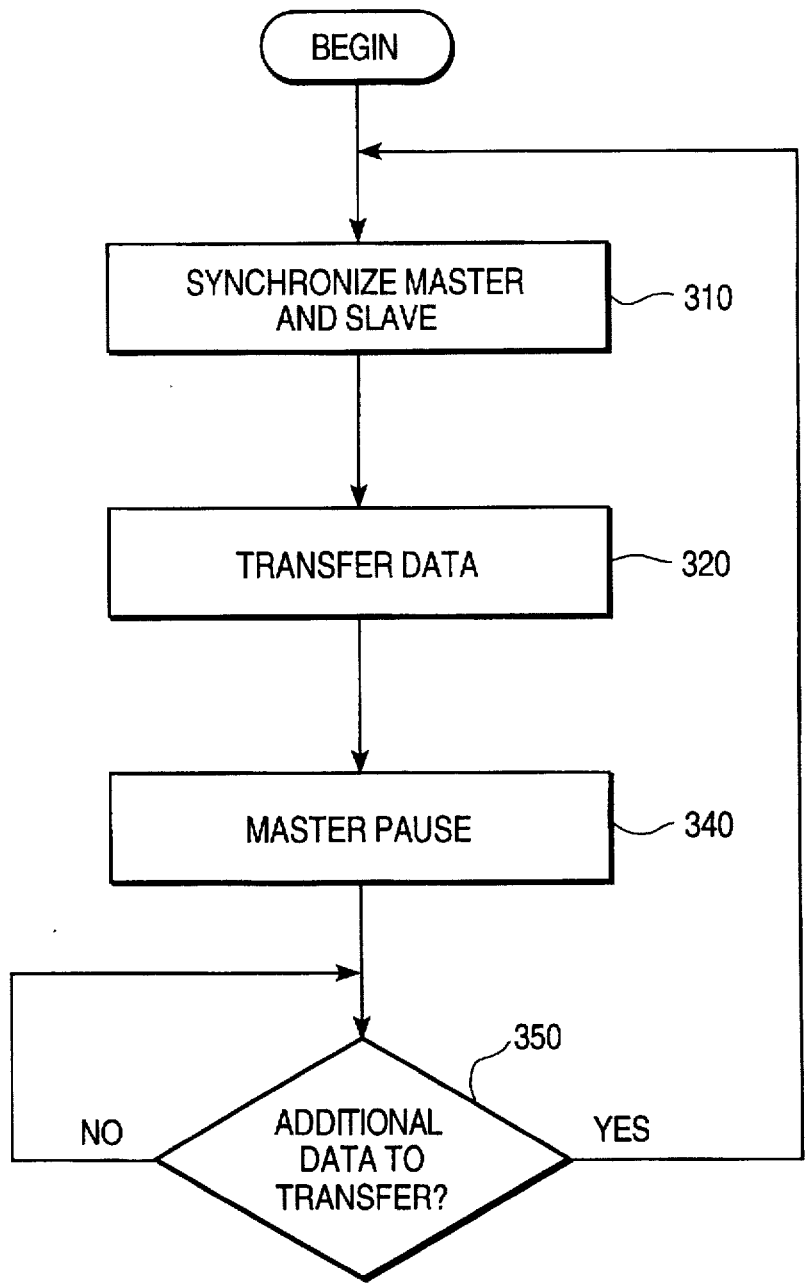
FIG_3

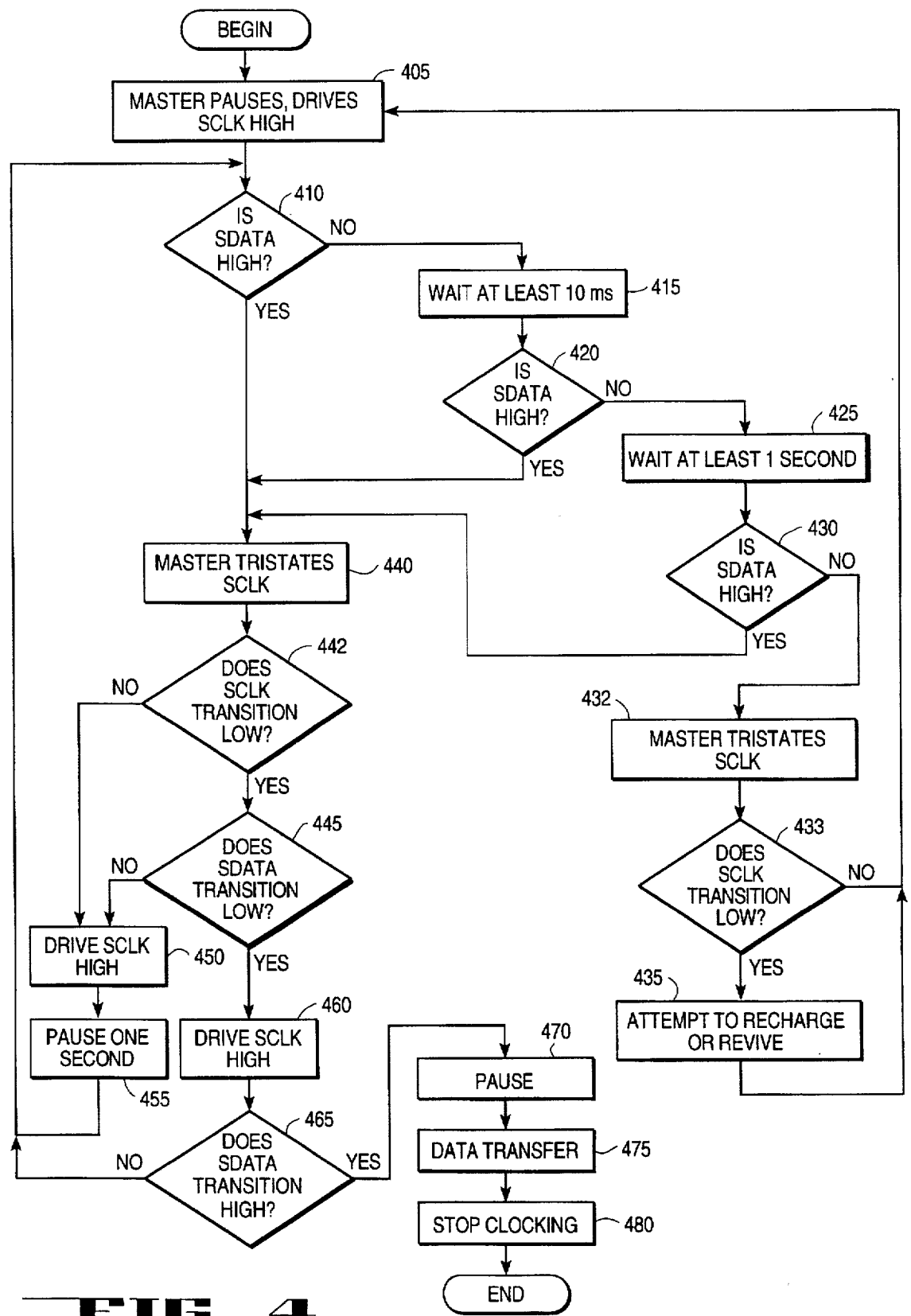
FIG_4

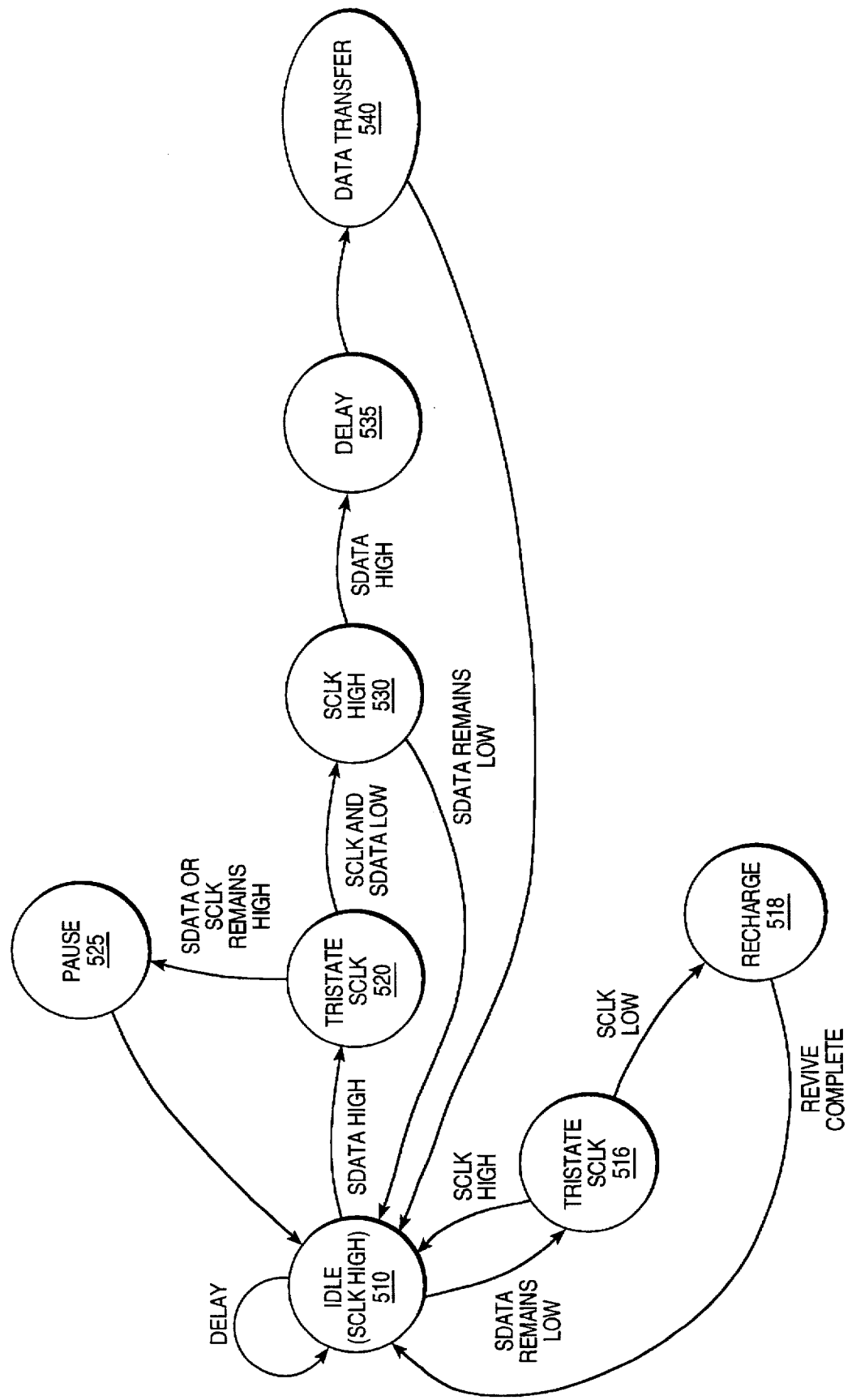
FIG_5

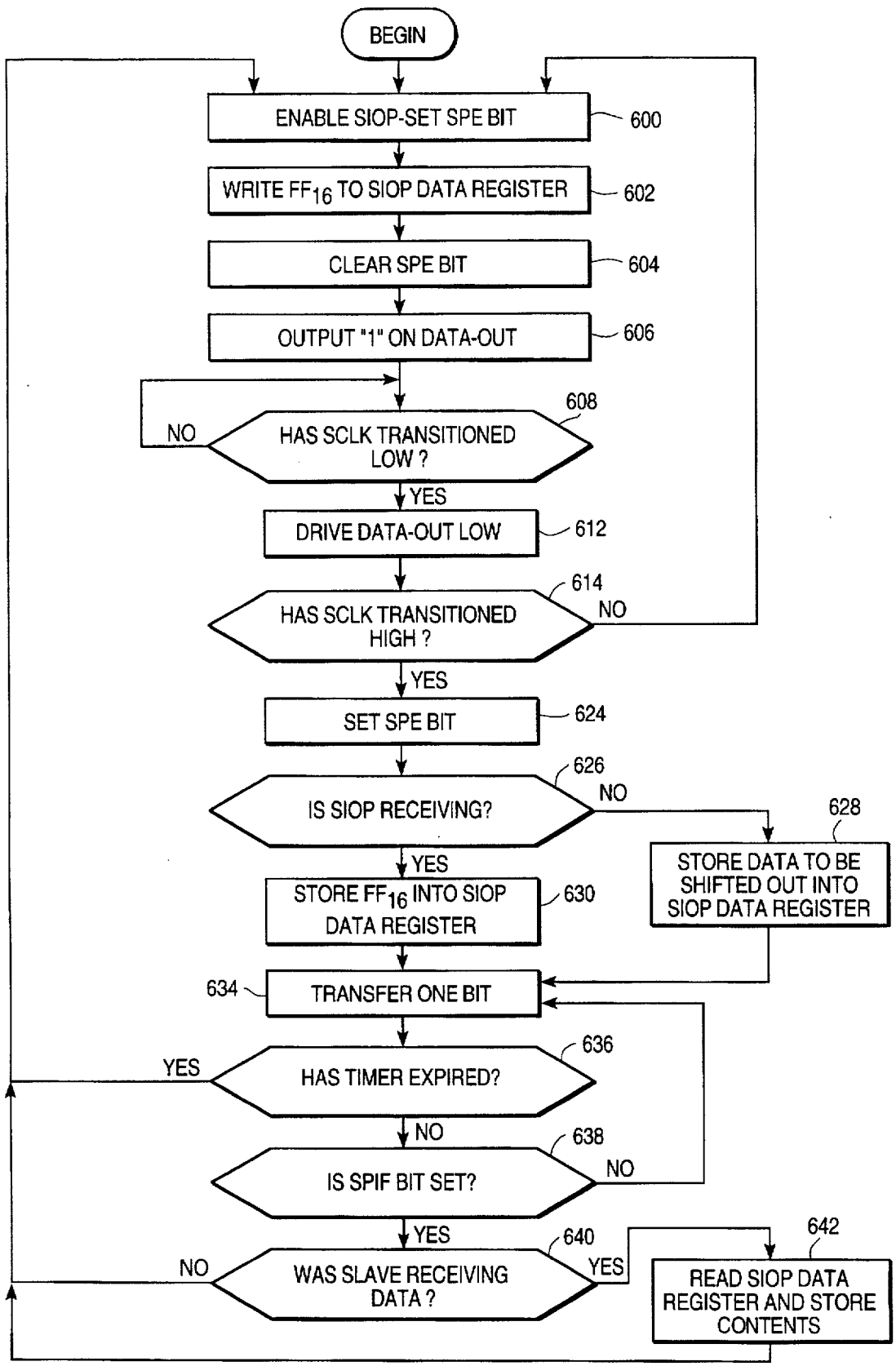
FIG_6

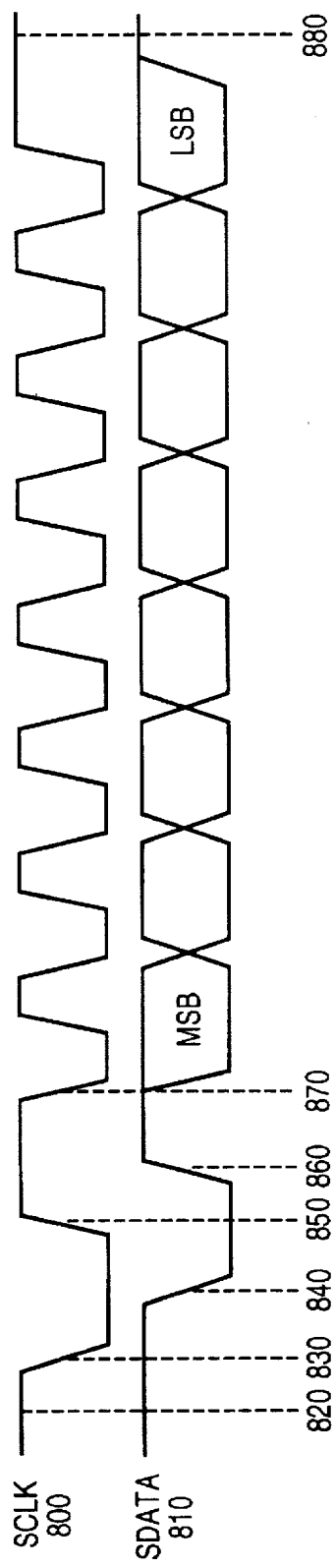
FIG_XA
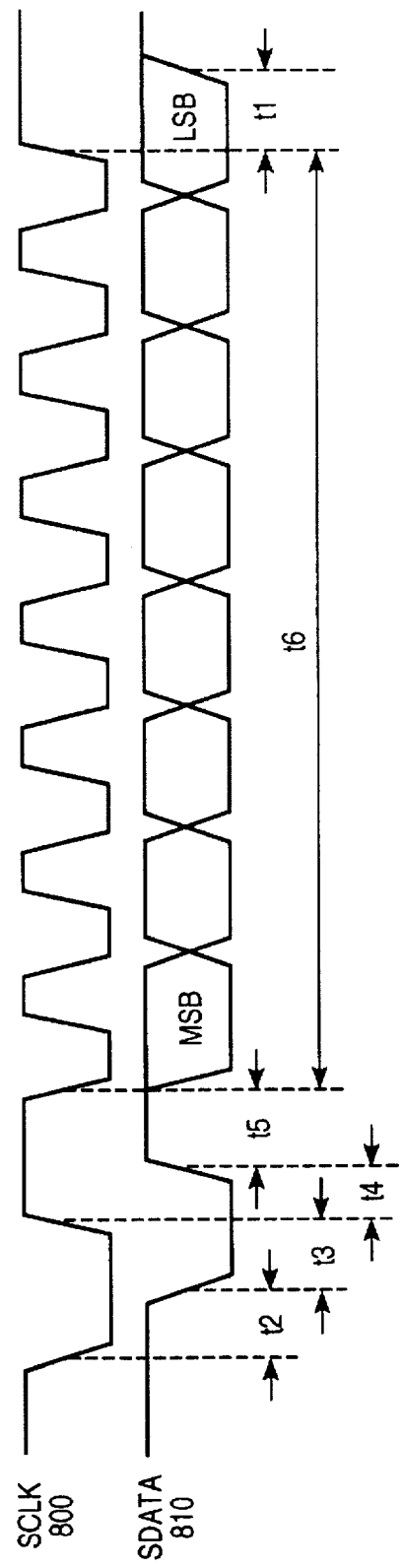
FIG_XB

METHOD AND APPARATUS FOR PROVIDING A HIGH THROUGHPUT TWO-CONDUCTOR SERIAL INTERFACE WITH SUPPORT FOR SLAVE DEVICE DETECTION

BACKGROUND OF THE INVENTION

1. Field of the Invention

The present invention pertains to the field of data transfer. More particularly, this invention relates to serial data transfer utilizing a two-conductor interface.

2. Background

As the physical size of circuit elements used in computer systems grows smaller and smaller and the number of individual circuit elements in an integrated circuit grows larger and larger, providing a sufficient number of terminals to connect the devices of the integrated circuit to external circuitry becomes an increasing problem. Along with the reduction in size of the area available for terminals due to the reduction in size of the integrated circuits has come an increase in the word size of the data handled by computers. Typically, newer computers are being designed to handle thirty-two and even sixty-four bit word lengths. Thus, it is becoming increasingly difficult to find room for terminals to transfer signals in addition to those transferred over a primary bus.

Similarly, the housings which contain the integrated circuits may be limited in size. As computer systems become smaller and smaller, the available space for removable devices and expansion devices within the systems is correspondingly reduced. Thus, the housings for removable devices and expansion devices must be reduced in size in order to allow the same number of expansion or removable devices to be coupled to the system. This results in a corresponding reduction in the available space for terminals in these housings to transfer data between the removable or expansion device and the rest of the system.

Thus, it is desirable to provide an interface for connecting multiple agents in a system utilizing a minimal number of terminals. The present invention provides such a solution.

In addition, integrated circuits used in modern computer systems contain a wide variety of input/output (I/O) configurations. One such configuration utilizes a single terminal through which data is both input and output. One type of control mechanism for such a configuration includes a buffer or register coupled to the I/O port.

A second I/O configuration utilizes two terminals: one dedicated to data input and the second dedicated to data output. One type of control mechanism for this configuration utilizes a shift register coupled to an input-dedicated port and an output-dedicated port. The shift register is coupled to the two ports such that data is shifted into one end of the register from one port and shifted out of the opposite end of the register through the other port. The use of a single shift register and an input-dedicated and output-dedicated port can be beneficial due to the lower amount of control logic necessary to implement the configuration and its correspondingly reduced cost.

One such I/O configuration is the serial I/O port (SIOP) from Motorola®. The SIOP is used, for example, in the Motorola® MC68HC05P6 and Motorola® MC68HC05P9 microcontrollers.

Due to the wide variety of I/O configurations commercially available and the various advantages of each type, certain circumstances arise in which it is desirable to combine circuits employing different I/O configurations and control mechanisms. Thus, it would be desirable to provide a mechanism for interconnecting a single-I/O port circuit with a circuit containing a shift register coupled to an input-dedicated port and an output-dedicated port. Furthermore, it would be desirable to provide a mechanism which provides a high throughput transfer rate of data between these ports. Such a mechanism would allow rapid transfer of data between these ports, thereby freeing up the circuits containing the ports and allowing them to attend to other tasks. The present invention provides such a solution.

An additional problem in utilizing removable and/or expansion devices is detecting the presence of such devices. That is, many computer systems can operate either with or without particular devices coupled to the system. For these devices, it can be advantageous to distinguish between the absence of the device and the presence of an inactive device. For example, a portable computer system may be capable of being coupled to a battery pack; the system can draw power from the battery pack when installed, or from an external power source such as an electrical outlet. Thus, it would be beneficial to provide a mechanism which allows the system to determine whether a battery pack is coupled to the system, while at the same time distinguishes between the absence of a battery pack and the presence of a battery pack without a charge. The present invention provides such a mechanism.

Additionally, as computer systems become smaller and smaller, the versatility of these systems becomes greater and greater. This reduced size leads to increasing use of portable computer systems. Many such portable systems utilize rechargeable batteries as a power source, thereby eliminating the need, at least temporarily, for power cords, power adapters, and electrical outlets.

The use of a computer system portably introduces the system to a more hostile environment than that experienced by desktop computer systems. A portable system can be moved by the user during system operation. The jostling of the computer system during such movement can cause sporadic contact between certain removable devices coupled to the system, such as batteries or expansion devices. Sporadic contact is also often experienced when a removable device is inserted into a computer system. A certain amount of "bouncing" of contacts is often experienced until the removable device is securely in place. This sporadic contact can significantly reduce system performance by interfering with the data transfer between the removable device and the rest of the system.

Thus, it would be beneficial to provide a system which maintains efficient performance despite the adverse impact of such sporadic contacts. The present invention provides such a system.

SUMMARY OF THE INVENTION

The present invention comprises a method and apparatus for providing a high throughput two signal conveyance media, e.g. two-conductor, serial interface with support for slave device detection. Multiple devices or agents, including a master agent and a slave agent, are interconnected over a two-conductor bus system. One signal conveyance medium, e.g. a first conductor, is utilized to transfer data signals between the agents and the second signal conveyance medium, e.g. a second conductor, is utilized to transfer a clock signal between the agents to register or strobe the data.

One feature of this interface is the ability of the master agent to detect the presence of slave agents which may be removed or added during operation. The protocol is robust in that disconnections and re-connections of the interface are tolerated and communication can be re-established upon re-connecting.

The master agent includes a single data port for both input and output. The slave agent includes two data ports: an input port and an output port. A circuit is situated between the output port of the slave agent and the data conductor which allows the input port and output port to be coupled to a single conductor, thereby allowing data to be input to and output from the slave agent on a single line.

Data is transferred between the master and slave agents by first synchronizing the agents. The synchronization process involves determining the readiness of the agents for data transfer. The agents are synchronized by first allowing the data conductor to obtain a high state. Upon sensing the data conductor in a high state, the master agent either drives the clock conductor to a low state or stops driving the clock conductor to allow an external resistor to pull the clock conductor to a low state. If the slave agent observes the clock conductor go low and is ready for a transfer, it responds by driving the data conductor low. The master agent then drives the clock conductor high in response to the slave agent driving the data conductor low. The slave agent then drives the data conductor high, and prepares for the data transfer. At this point the master and slave agents are synchronized and the data transfer can be performed.

In one embodiment, the synchronization process also involves the detection of the presence or absence of the slave agent. In this embodiment, upon sensing the data conductor in a high state, the master agent stops driving the clock conductor to allow external resistors (a pull-up resistor on the master side and a stronger pull-down resistor on the slave side) to indicate the presence of the slave agent (a low state on the clock conductor indicates the slave agent is connected). The master agent proceeds with synchronizing for a data transfer if the slave agent is detected; otherwise, the master agent continues to check for the presence of the slave agent.

BRIEF DESCRIPTION OF THE DRAWINGS

The present invention is illustrated by way of example and not limitation in the figures of the accompanying drawings, in which like references indicate similar elements and in which:

FIG. 2B is a circuit diagram showing exemplary circuitry between a slave agent and the interface connectors in one embodiment of the present invention;

FIG. 2C is a block diagram showing a master agent in one embodiment of the present invention;

FIG. 2E is a block diagram showing the I/O ports of a slave agent in one embodiment of the present invention;

FIG. 3 is a flowchart illustrating the method of transferring data in one embodiment of the present invention;

FIG. 4 is a flowchart showing the method of operation of a master agent in one embodiment of the present invention;

FIG. 5 is a state diagram of a master state machine used in one embodiment of the present invention;

FIG. 6 is a flowchart showing the method of operation of a slave agent in one embodiment of the present invention;

FIG. 8A is a timing diagram illustrating the operation of one embodiment of the present invention; and FIG. 8B is a timing diagram showing the timing specifications for one embodiment of the present invention.

DETAILED DESCRIPTION

Figure 1:
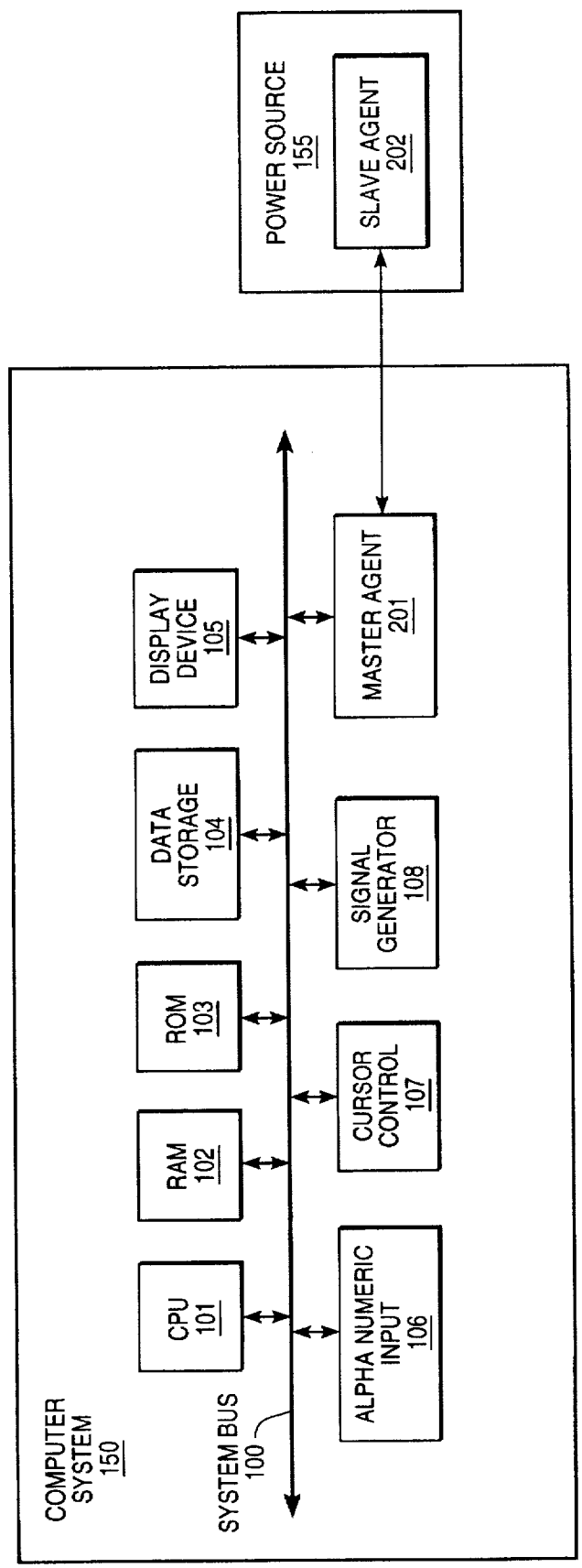
FIG. 1 is a block diagram of a computer system in which the present invention may be practiced.

In the following detailed description numerous specific details are set forth in order to provide a thorough understanding of the present invention. However, it will be understood by those skilled in the art that the present invention may be practiced without these specific details. In other instances, well-known methods, procedures, components, and circuits have not been described in detail so as not to obscure aspects of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the following discussion multiple references are made to specific time values. These specific values represent examples of predetermined time periods in which a particular event should occur; for example, a specific period of waiting by the slave agent for an action to be taken by the master agent. These specific values are exemplary only; it should be understood by those skilled in the art that a wide range of time values can be used within the scope and spirit of the present invention.

The specific signal conveyance media described herein comprises conducting material (e.g., wires), but it will be appreciated that other signal conveyance media (e.g., fiber optic cables, air, vacuum, etc.) may be utilized in accordance with the present invention.

FIG. 1 is a block diagram of a computer system 150 in which the present invention may be practiced. The system comprises a bus 100 for communicating information, a central processor (CPU) 101 coupled to the bus for processing information and instructions, a random access memory (RAM) 102 coupled to the bus 100 for storing information and instructions for the central processor 101, a read only memory (ROM) 103 coupled to the bus 100 for storing static information and instructions for the processor 101, a data storage device 104 such as a magnetic disk and disk drive coupled to the bus 100 for storing information (such as audio or voice data) and instructions, a display device 105 coupled to the bus 100 for displaying information to the computer user, an alphanumeric input device 106 including alphanumeric and function keys coupled to the bus 100 for communicating information and command selections to the central processor 101, a cursor control device 107 coupled to the bus for communicating user input information and command selections to the central processor 101, and a signal generating device 108 coupled to the bus 100 for communicating command selections to the processor 101.

In one embodiment of the present invention, the signal generation device 108 includes, as an input device, a standard microphone to input audio or voice data to be processed and stored by the computer system. The signal generation device 108 includes an analog to digital converter to transform analog voice data to digital form which can be processed by the computer system. The signal generation device 108 may also be coupled to a tape cassette player to input stored voice or audio data into the central processor 101 and the remainder of the system over bus 100. The signal generation device 108 also includes, as an output, a standard speaker for realizing the output audio from input signals from the computer system. Block 108 also includes well known audio processing hardware to transform digital audio data to audio signals for output to the speaker, thus creating an audible output.

The display device 105 utilized with the computer system and the present invention may be a liquid crystal device, cathode ray tube, or other display device suitable for creating graphic images and alphanumeric characters (and ideographic character sets) recognizable to the user. The cursor control device 107 allows the computer user to dynamically signal the two dimensional movement of a visible symbol (pointer) on a display screen of the display device 105. Many implementations of the cursor control device are known in the art including a trackball, mouse, joystick or special keys on the alphanumeric input device 105 capable of signaling movement of a given direction or manner of displacement. It is to be appreciated that the cursor means 107 also may be directed and/or activated via input from the keyboard using special keys and key sequence commands. Alternatively, the cursor may be directed and/or activated via input from a number of specially adapted cursor directing devices, including those uniquely developed for the disabled. In the discussions regarding cursor movement and/or activation within the preferred embodiment, it is to be assumed that the input cursor directing device or push button may comprise any of those described above and specifically is not limited to the mouse cursor device.

FIG. 1 also shows a power source 155. Power source 155 is one means for providing power to the system 150. In one embodiment of the present invention, power source 155 is a removable, rechargeable battery, which can be removed easily by the user and replaced with the same or a similar battery. Power source 155 is coupled to system 150 via master agent 201 and slave agent 202, both of which are described in more detail below. In one embodiment of the present invention, master agent 201 and slave agent 202 are interconnected over two sets of conductors. The first set of conductors is used in the serial interface of the present invention, as described in more detail below. The second set of conductors are the positive and negative terminals to transfer power from power source 155 to system 150.

Figure 2A:
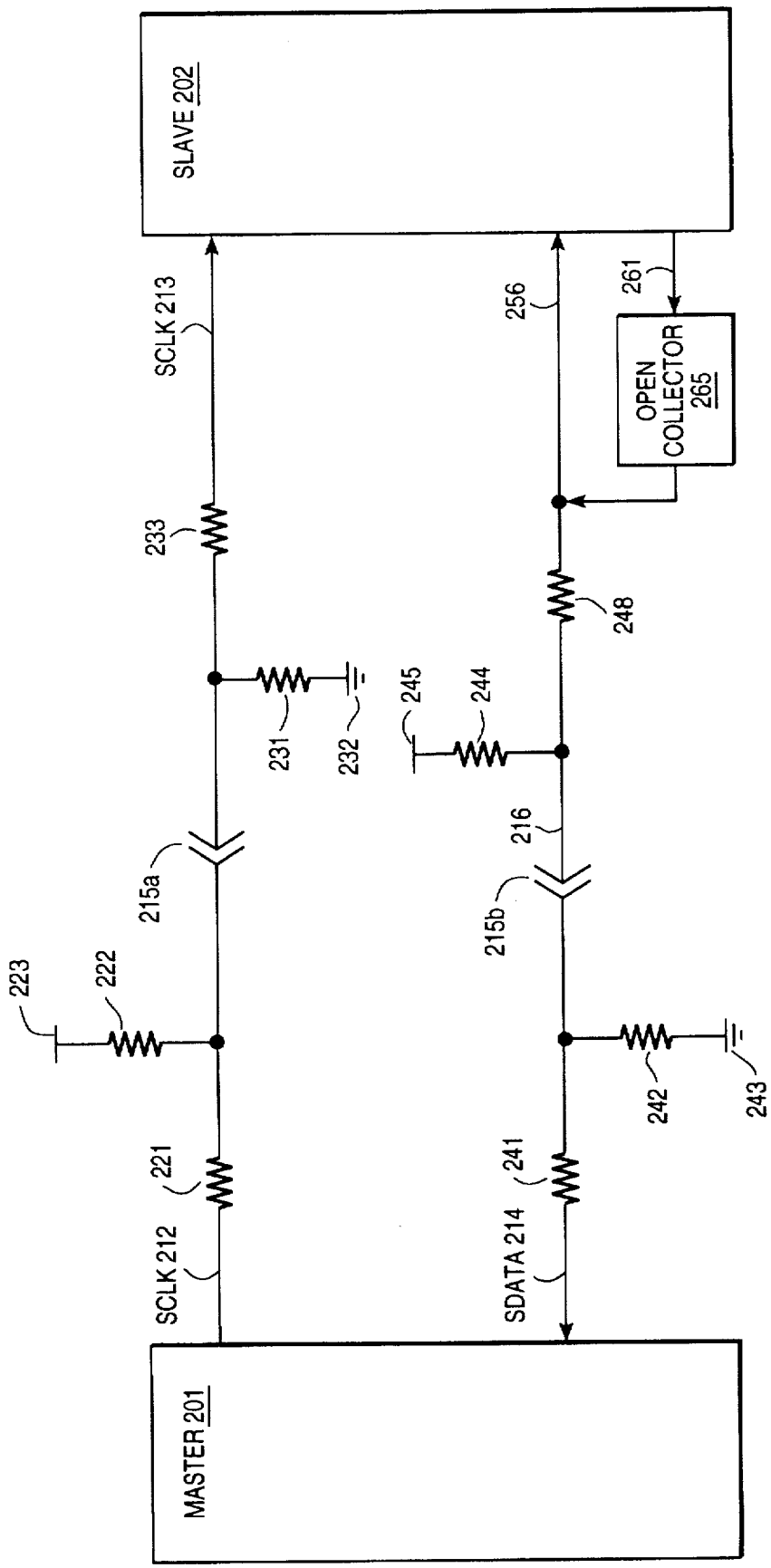
FIG. 2A is a partially-block, partially-circuit diagram showing the interconnection of two agents in one embodiment of the present invention.

FIG. 2A is a partially-block, partially-circuit diagram showing the interconnection of two devices, or agents, in one embodiment of the present invention. These agents are master agent 201 and slave agent 202. Master agent 201 is a Motorola® MC68HC05PGE 8-bit microcontroller and slave agent 202 is a Motorola® MC68HC05P6 8-bit microcontroller. It should be understood by those skilled in the art, however, that a wide variety of commercially available microcontrollers may be used as master agent 201 or slave agent 202.

Master agent 201 and slave agent 202 can be configured as either master agents or slave agents. Each agent contains a control register with a bit which indicates whether the agent is operating as a master or as a slave. However, in the embodiments discussed below, master 201 acts solely as a master agent and slave 202 acts solely as a slave agent. That is, all data transfer is initiated by master agent 201. Data can be transferred to or from slave agent 202, however slave 202 does not attempt to synchronize the agents for a data transfer.

In one embodiment of the present invention, master 201 is affixed to the computer system 150 of FIG. 1 and slave 202 is coupled to removable power source 155 of FIG. 1. However, it should be understood by those skilled in the art that the present invention is not limited to this configuration. The mechanism of the present invention can be applied to the serial interconnection of any two devices.

The conductors between master agent 201 and slave agent 202 are operated at conventional logic levels. For example, a voltage between approximately +2.0 volts and +5.5 volts on a conductor represents a "high" state and a voltage of between approximately 0 volts and +0.8 volts on a conductor represents a "low" state. However, it should be understood by those skilled in the art that the precise voltage ranges for a "high" or "low" level is not a necessary constraint for practicing this invention. The use of these logic levels is well-known in the art and thus will not be discussed further.

Two connectors are shown in FIG. 2A, connector 215a in SCLK line 212 and connector 215b in SDATA line 214. In one embodiment of the present invention, slave agent 202 along with its associated circuitry can be disconnected from master agent 201 and its associated circuitry. Connectors 215a and 215b show the location of this interconnection in one mode of operation. When connected, connector 215a couples together SCLK line 212 and SCLK line 213. Similarly, when connected, connector 215b couples together SDATA line 214 and SDATA line 216.

Connectors 215a and 215b can be any of a wide variety of conventional connectors. For example, SCLK line 212 may terminate at connector 215a in a flat plate, while SCLK line 213 terminates at connector 215a in a protrusion. When these two termination points are placed in physical contact with each other, the circuit is completed and signals may freely travel between master 201 and slave 202 over SCLK line 212 and 213.

A resistor 221 is also shown in SCLK line 212. Resistor 221 is a very low impedance resistor which reduces electrostatic discharge upon connection of SCLK line 212 to SCLK line 213. Similarly, very low impedance resistors 233, 241, and 248 are shown in SCLK line 213, SDATA line 214, and SDATA line 216, respectively. In one embodiment of the present invention, resistors 221, 233, 241, and 248 are 470 $\Omega$, 1 k$\Omega$, 470 $\Omega$, and 1 k$\Omega$ resistors, respectively. These resistors reduce transients associated with first contact through connectors of devices that may initially be at different potentials from each other, and thereby allow a removable device to be inserted without powering-off the system. The use of such resistors is well-known in the art, and thus will not be discussed further.

In one embodiment of the present invention, power source 223 is coupled to SCLK line 212 through high impedance resistor 222. Resistor 222 acts as a conventional pull-up resistor. Similarly, a low impedance resistor 231 is coupled to SCLK line 213. Resistor 231 acts as a conventional pull-down resistor. In one mode of operation, resistor 222 is a 470 kΩ resistor, resistor 231 is a 27 kΩ resistor, and power source 223 is +5 volts potential with respect to "ground" source 232.

High impedance resistor 222 and power source 223 assist master agent 201 in determining whether it is coupled to a slave agent 202 (and thus a battery). If slave agent 202 is not connected, then the state of SCLK line 212 is pulled high by power source 223 and resistor 222. However, if slave 202 is connected, then the state of SCLK line 212 and 213 is pulled low by low impedance resistor 231 and ground 232. Thus, by checking the state of SCLK line 212, master 201 can determine whether slave agent 202 is connected to the system. Note that the resistance value of resistor 231 should be selected to be high enough that it does not interfere with the ability of master agent 201 to drive a dock signal over SCLK line 212 and 213 which can be received by slave 202. Also, the resistance value of resistor 231 should be selected to be enough smaller than the resistance value of resistor 222 to enable SCLK line 212 and 213 to be definitely in one logic voltage region or the other when master 201 is sensing the presence of slave 202.

It should be comprehended by those skilled in the art that pull-up resistor 222 and pull-down resistor 231 are exemplary only. Resistors 222 and 231 can be replaced by any conventional pull-up and pull-down devices.

It should also be comprehended by those skilled in the art that the use of high impedance resistor 222 and low impedance resistor 231 is not necessary for the synchronization method described below. High impedance resistor 222 and low impedance resistor 231 can be removed from the system within the scope and spirit of the present invention.

A high impedance resistor 242 is also coupled to SDATA line 214. Resistor 242 operates as a conventional pull-down resistor which pulls the state of SDATA line 214 low if slave 202 is not coupled to master 201 via connector 215b. Thus, master 201 can also utilize SDATA line 214 being in a low state, in conjunction with SCLK line 212 being in a high state, to confirm when slave 202 is not coupled to master 201. Resistor 242 also keeps line 214 from floating into a voltage region that is not defined as a "high" or "low" logic state.

Although the above discussion describes SCLK lines 212 and 213 being pulled high and low by pull-up and pull-down resistors, respectively, it should be understood by those skilled in the art that the present invention may be implemented without such resistors. For example, the discussion below describes master 201 tristating SCLK line 212 to begin synchronization. However, beginning synchronization could be implemented without pull-up and pull-down resistors by master 201 driving SCLK line 212 low.

FIG. 2B is a circuit diagram showing exemplary circuitry between connectors 215 and slave 202. In addition, FIG. 2B shows an example open collector device 265 which couples data_out line 261 and data_in line 256, allowing them to share SDATA line 216. The use of open collector device 265 is discussed in more detail below. It should be noted that many other circuit implementations of open collector device 265 could be utilized within the spirit and scope of the present invention.

An exemplary master agent 201 is shown in more detail in FIG. 2C. Master 201 includes two ports used in the present invention for serial communication with slave agent 202: clock port 205 and data port 206. Clock port 205 is coupled to SCLK line 212. Master 201 generates the SCLK signal which is output onto SCLK line 212. Data port 206 is used by master 201 for both input and output of data signals over SDATA line 214. In one embodiment of the present invention, master 201 also includes additional ports, identical to ports 205 and 206, for interfacing with devices other than slave 202.

Clock port 205 and data port 206 are general purpose I/O ports and operate in a conventional manner. Each port may drive a high signal or a low signal (to transmit data signals), or be tristated (to receive data signals); the function of these ports is an implementation of software. Such general purpose I/O ports are well-known in the art and thus will not be described further.

Master agent 201 also includes master state machine 203 and various associated circuitry for producing the signals necessary to the operation of the microcontroller. In one embodiment of the present invention, master state machine 203 controls the synchronization and data transfer with slave agent 202, as described in more detail below.

In one embodiment of the present invention, master agent 201 also manages other operations. For example, master agent 201 may be coupled to a second slave agent similar to slave 202, or be coupled to a user interface device.

Figure 2D:
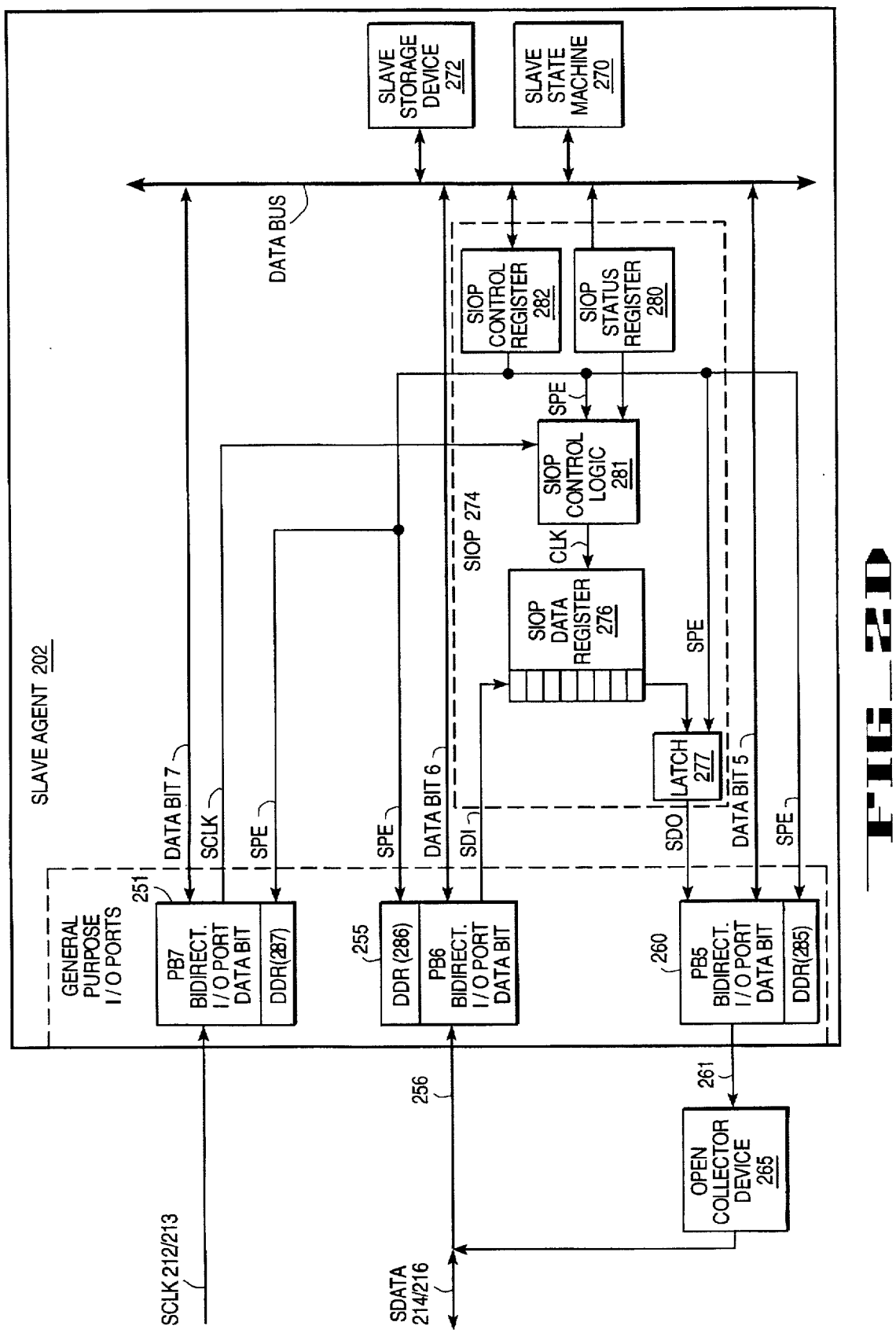
FIG. 2D is a block diagram showing a slave agent in one embodiment of the present invention.

An exemplary slave agent 202 is shown in more detail in FIG. 2D. Slave 202 includes a slave state machine 270, storage device 272, a serial input/output port (SIOP) 274, and general purpose ports 251, 255, and 260. Port 255, port 260, and port 251 can operate in two modes. In the first mode, "SIOP mode," port 255 is a dedicated input port for SIOP 274 and port 260 is a dedicated output port for SIOP 274. Port 251 is an input port if slave 202 is in a slave mode or an output port if slave 202 is in a master mode. In one embodiment of the present invention, slave 202 is always in slave mode, thus port 251 is an input port. SIOP 274 is in SIOP mode when the SIOP enable (SPE) bit is set.

In the second mode, "basic I/O mode," ports 255, 260, and 251 are programmable to be either input or output, and each can be forced high or low as an output. SIOP 274 is in basic I/O mode when the SPE bit is not set. FIG. 2E shows ports 251, 255 and 260 in more detail. Slave 202 utilizes both of these modes in synchronizing and performing the data transfer, as described in more detail below.

In FIG. 2E, ports 251, 255 and 260 of one embodiment of the present invention are shown in more detail. In this embodiment, the slave 202 is configured through a SIOP register setting to always be the slave when the SIOP is enabled (SPE bit set). As shown, each port will operate as either input or output, based on the setting of the data direction registers 285, 286, and 287. When the SPE bit is set (i.e., SIOP mode is enabled), each register 285-287 is set, so ports 251 and 255 are input ports (bringing in signals on SCLK and SDI, respectively), and port 260 is an output port driving out internal signal SDO. However, when the SPE bit is not set, the direction of each port is dependent on the data direction bit, as set by slave 202 (this could be done by slave state machine 270, or a program stored in storage device 272). Data bit 5, data bit 6, and data bit 7 are input to ports 260, 255, and 251, respectively. As shown, bits 5–7 are input to both a 1-bit buffer or data I/O register and their respective data direction registers (DDRs); slave 202 stores bits into either the buffer or DDR by accessing the proper address of the buffer or DDR it is writing to. When the SPE bit is not set, the value input to or output from each port 251, 255, and 260 is data bit 7, data bit 6, and data bit 5, respectively. It should be noted that although port 260 may operate as either input or output when in basic I/O mode, the presence of open collector device 265 coupled to line 261 prevents data from SDATA line 216 from being input to port 260. Also, software within the slave device 202 keeps port 260 configured as an output in basic I/O mode and the SIOP implementation keeps port 260 configured as an output in SIOP mode.

The use of these ports in both SIOP mode and basic I/O mode is also described in the Motorola® MC68HC05P6 technical handbook.

In one embodiment of the present invention, slave agent 202 samples data in from data_in line 256 on the rising edge of a clock cycle and shifts data out on data_out line 261 on the falling edge of a clock cycle when the SPE bit is set. Thus, when slave 202 is receiving data, it samples the data from master 201 in on the rising edge of each clock cycle (placing the data in SIOP data register 276) and shifts data out on the falling edge of each clock cycle. As described in more detail below, when slave 202 is receiving data it also shifts out a "1" continuously because $FF_{16}$ is loaded into SIOP data register 276. However, when slave 202 is transmitting data, slave 202 shifts the data being transmitted (typically not $FF_{16}$) out on the falling edge of each clock cycle, and samples the same data back in on the rising edge of each cycle.

In SIOP mode, port 260 is a dedicated output port. Port 260 outputs a signal to open collector device 265 via data_out line 261. Open collector device 265, coupled with pull-up resister 244, in turn, outputs a signal onto SDATA line 216. Open collector device 265 may be any of a wide variety of conventional open collector devices, such as the device shown in FIG. 2B. When the signal on data_out line 261 is high, open collector device 265 is tristated. That is, open collector device 265 operates as a high impedance device coupled to SDATA line 216 when the signal on data_out line 261 is high. If SDATA line 216 is tristated by other devices as well, pull-up resistor 244 will pull the line to a logic high level. However, when the signal on data_out line 261 is low, open collector device 265 drives a low signal onto SDATA line 216.

Referring to FIGS. 2A and 2D, when slave 202 is receiving data, master 201 is driving SDATA lines 214 and 216. Thus, a high signal from master 201 is received by slave 202 as a high signal on port 255, and a low signal from master 201 is received by slave 202 as a low signal on port 255. However, when slave 202 is transferring data out, master 201 is not driving SDATA lines 214 and 216. A high signal from slave 202 causes open collector device 265 to be tristated, however low impedance resistor 244, coupled to +5 volt power source 245, pulls the state of SDATA lines 214 and 216 high in spite of high impedance resistor 242 which is insignificant compared to the current sourcing ability of resistor 244. Thus, a high signal is received by master 201. A low signal from slave 202 causes open collector device 265 to pull the state of SDATA lines 214 and 216 low, and a low signal is received by master 201.

Slave agent 202 includes a storage device 272. Storage device 272 is a conventional storage device, such as a RAM or EEPROM. The storage device 272 contains the data to be transferred to master 201 (via SIOP data register 276) and is also the location in which data received from master 201 is stored.

Slave agent 202 also includes slave state machine 270 and various associated circuitry for producing the signals necessary to the operation of the microcontroller. Slave state machine 270 controls the synchronization and data transfer with master agent 201; the operation of state machine 270 is described in more detail below in FIGS. 6 and 7.

SIOP 274 includes SIOP data register 276, latch 277, SIOP status register 280, SIOP control register 282 and SIOP control logic 281. Latch 277 operates in a conventional manner to latch the last bit from register 276 which is shifted out via port 260. Register 276 is a conventional shift register which stores the data to be shifted both out and in during a data transfer. In one embodiment of the present invention, SIOP data register 276 is an eight-bit register.

SIOP status register 280 includes status bits for the operation of SIOP 274. These bits include a SIOP interrupt flag (SPIF) bit which is set by SIOP control logic 281 when a data transmission is complete. SIOP control register 282 includes control bits for the operation of SIOP 274. These bits include a SPE bit which indicates SIOP mode is enabled (if the bit is set) or disabled (if the bit is not set).

FIG. 2A shows only two agents, however it should be understood by those skilled in the art that additional slave agents can be added. Multiple slaves could share the same data conductor (SDATA line 214), with each having a separate clock signal conductor (SCLK line 212). This would enable a master agent to detect the presence of a particular slave agent, to synchronize to a particular slave agent and to perform a data transfer to it by tristating the SCLK line coupled to that particular slave agent. Similarly, multiple master agents could be coupled to the same slave agent using the same SCLK and SDATA lines, providing a method is employed to ensure two master agents do not attempt to access the same slave agent at the same time. Any of a wide variety of conventional arbitration methods may be employed to ensure this.

Using the SCLK lines 212 and 213 in conjunction with the SDATA lines 214 and 216, data can be transferred serially between the master agent 201 and slave agent 202. Master 201 begins synchronization by tristating clock port 205 to request slave 202 for a transfer; by tristating clock port 205, master 201 allows resistor 231 and ground 232 to pull SCLK lines 212 and 213 low. Slave 202 indicates it is ready for a transfer by dropping SDATA lines 214 and 216. Master 201 then raises SCLK lines 212 and 213 to verify that slave 202 is ready for a transfer. Slave 202 responds by raising SDATA lines 214 and 216, thereby verifying it is ready for a data transfer. Both master and slave agent are preprogrammed with the same delay time which each pauses before beginning the data transfer. Thus, the data transfer proceeds after this pause in synchronization. By performing this synchronization before each data transfer, synchronized data transfer is preserved despite any sporadic contact between master 201 and slave 202.

FIG. 3 is a flowchart illustrating the method of transferring data between master 201 and slave 202 in one embodiment of the present invention. Data may be transferred either from master 201 to slave 202, or from slave 202 to master 201.

Prior to the transfer of data, the master and slave are synchronized, step 310. The master and slave agent are synchronized during data transfers, however the agents need not be synchronized between data transfers. The beginning of the synchronization step is asynchronous, as shown below; thus, either agent can attend to other tasks between data transfers. That is, between data transfers, both the master agent and the slave agent can attend to their own asynchronous, higher priority tasks, until they are both agreed to be in lockstep for the data transfer. This synchronization step also allows the master agent to confirm the presence or absence of the slave agent, in the case of removable slave agents. The lockstep portion of the data transfer allows for high throughput, since both devices at this point are dedicated to shifting the serial data as quickly as they can. The SIOP interface on the slave, though not required, enhances this throughput with dedicated hardware responsiveness to shifting data to/from the master.

Upon establishing synchronization between the master agent and slave agent, the data transfer occurs, step 320. In one embodiment of the present invention a data transfer consists of transferring eight bits of data, most significant bit first. The present invention, however, is not limited to this type of data transfer. For example, a data transfer could consist of a 4-bit transfer, a 16-bit transfer, or a transfer of the least significant bit first. Although the embodiment described utilizes the SIOP interface to simplify implementation and enhance throughput, another embodiment could emulate the SIOP interface within the slave software routines running in the slave state machine, and gain most if not all of the benefits of the present invention.

Upon completing a transfer, master 201 pauses temporarily, step 340. This pause is incurred to allow slave 202 a period of time to process the data it received (e.g., storing it in RAM) before beginning another data transfer or to allow the master to process data. In one embodiment of the present invention, this pause is incurred regardless of whether slave 202 processes the data.

After pausing, master 201 determines whether additional data needs to be transferred, step 350. If additional data does need to be transferred, the master and slave again synchronize themselves, step 310. However, if no additional data needs to be transferred at the current moment, both master 201 and slave 202 wait until data does need to be transferred. This is shown in FIG. 3 by continuously repeating step 350 until additional data does need to be transferred. If data does need to be transferred at some future time, the above steps are repeated to transfer the data.

FIG. 4 is a flowchart showing the method followed by master agent 201 in performing a data transfer in one embodiment of the present invention. When data needs to be transferred either to or from slave 202, master 201 initially pauses and drives SCLK line 212 high, step 405. This pause provides slave agent 202 with the necessary period of time to store any data which was received in a previous transfer, as discussed above in step 330. In one mode of operation, the pause of step 405 is at least 50 microseconds (µs). Master 201 need not perform step 405 if a 50 µs pause was incurred after a previous data transfer.

The pause of step 405 also provides master 201 with the opportunity to perform other tasks. Master 201 may have other system tasks to perform in addition to communicating with slave 202. For example, master 201 may be in communication with another device over different communication lines, such as a second slave agent. Thus, master 201 can communicate with other devices between data transfers to slave 202 during this pause at step 405.

When master 201 is finished pausing and needs to perform a data transfer, it determines whether SDATA line 214 is in a high state, step 410. Master 201 tristates data port 206 (if it isn't already tristated), thus SDATA line 214 goes to a high state if slave 202 is present and ready for synchronization, as discussed in more detail below. If SDATA line 214 is high, then master 201 proceeds with the synchronization by tristating SCLK line 212, step 440 below.

If SDATA line 214 is not in a high state, then master 201 pauses before proceeding, step 415. In one mode of operation, this pause is a minimum of 10 milliseconds (ms). Master 201 presumes slave 202 is not ready to synchronize for a data transfer when SDATA is low at step 410. Thus, master 201 pauses at step 415 and again determines whether SDATA 214 is in a high state or a low state, step 420.

If SDATA 214 is now in a high state, then master 201 proceeds to tristate SCLK line 212, as discussed below in step 440. However, if SDATA line 214 is still in a low state, master 201 again pauses, step 425. In one mode of operation this second pause at step 425 is at least one second.

After this pause, master 201 again determines whether SDATA line 214 is in a high or low state, step 430. If SDATA line 214 is in a high state, then master 201 proceeds to tristate SCLK line 212, as discussed below in step 440. However, if SDATA line 214 is still in a low state, then master 201 tristates the SCLK line 212, step 432. Tristating SCLK line 212 allows master 201 to determine whether a slave agent is present based on whether SCLK line 212 goes low, step 433. If SCLK line 212 does not go low, then a slave agent is not present and master 201 returns to step 405. However, if SCLK line 212 goes low (indicating a slave agent is present), then master 201 presumes slave agent 202 and its associated circuitry (e.g., a re-chargeable battery) are not functioning properly and have no power. In one mode of operation, master 201 attempts to recharge the battery associated with slave 202, step 435. After attempting this recharge for a period of time (e.g., 10 seconds), master 201 again attempts to perform the data transfer by determining whether SDATA line 214 is in a high or low state, step 410.

Once master 201 determines SDATA line 214 is in a high state, master 201 tristates SCLK line 212, step 440, in a conventional manner. This enables master 201 to verify the presence of slave 202, by determining whether the signal on SCLK line 212 goes to a high state or a low state, step 442. As described above with reference to FIG. 2A, if slave 202 is coupled to master 201, then the signal on SCLK line 212 is pulled low; however, if slave 202 is not coupled to master 201, then the signal on SCLK line 212 is pulled high. In one mode of operation, master 201 pauses for one-half second at step 442, waiting for SCLK line 212 to transition low.

If master 201 does not detect SCLK line 212 low, then master 201 drives SCLK line 212 to a high state, step 450. Master 201 then pauses for one second, step 455, and attempts synchronization again at step 410.

However, if master 201 does detect SCLK line 212 in a low state at step 442, then master 201 looks for slave 202 to drive SDATA line 214 to a low state, step 445. If master 201 does not detect SDATA line 214 low within one-half second, then master 201 drives SCLK line 212 to a high state at step 450, pauses at step 455, and attempts synchronization again at step 410. If SDATA line 214 does go low at step 445, then master 201 drives SCLK line 212 to a high state, step 460. Master 201 then determines whether SDATA line 214 transitions to a high state, step 465. If SDATA line 214 does not transition to a high state within a predetermined period of time, then master 201 aborts the synchronization process and repeats it, beginning again at step 410. In one mode of operation, this predetermined period of time is one-half second.

If SDATA line 214 does transition to a high state within the predetermined period of time, then master 201 pauses, step 470. Both master 201 and slave 202 are preprogrammed with this period of time. In one mode of operation, this pause is 10 µs. After SDATA line 214 transitions to a high state, both agents expect SCLK lines 212 and 213 to transition low after 10 µs. Thus, both agents are synchronized for the data transfer, and master 201 drives SCLK lines 212 and 213 to pace the transfer of data bits.

The data transfer then begins, step 475. The amount of data transferred in step 475 is predetermined. In one mode of operation, a data transfer is eight bits. The data is transferred onto SDATA line 214 or received from SDATA line 214 through data port 206. The data transferred or received can be stored within master 201 in any of a wide variety of conventional manners, such as in a data register or buffer.

Master 201 can either transfer data to slave 202 or receive data from slave 202. Whether master 201 transfers or receives data is determined by the command protocol used by the agents. Both master 201 and slave 202 are preprogrammed with a predetermined command protocol. This command protocol defines what each data transfer signifies; for example, a data transfer could be a start-of-text signal, an end-of-text signal, a command such as read or write, data associated with a command, etc. Thus, the command protocol informs master 201 whether it should be transferring data to slave 202 (e.g., data associated with a write command), or receiving data from slave 202 (e.g., data associated with a read command), where the command precedes the read or write so that data direction is predictive.

Master 201 transfers one bit out or in via data port 206 in each clock cycle. Therefore, master 201 knows the number of clock cycles for a data transfer, given the number of bits to be transferred. Slave 202 shifts the last bit of the data transfer out on port 260 on the falling edge of the last clock cycle and samples the last bit of the data transfer in on port 255 on the rising edge of the last clock cycle.

Master 201 then stops clocking, step 480. Master 201 also tristates data port 206 if master 201 had been transmitting data, or leaves data port 206 tristated if master 201 had been receiving data. If master 201 needs to transfer additional data, then the above process is repeated, starting at step 405.

FIG. 5 is a state diagram of master state machine 203 of FIG. 2C used in one embodiment of the present invention. State machine 203 follows the method shown in the flowchart of FIG. 4. State machine 203 begins in Idle state 510 with master 201 driving SCLK line 212 high. If a data transfer needs to be made, state machine 203 determines whether the last data transfer (if any) occurred at least 50 µs earlier. If a 50 µs delay has not passed, then state machine 203 remains in idle state 510 until it has passed.

Once this period of time (50 µs) passes, state machine 203 determines whether the signal on SDATA line 214 is in a high state or a low state. If SDATA line 214 remains in a low state for at least 1.1 seconds, then state machine 203 transitions to Tristate SCLK state 516. In Tristate SCLK state 516, state machine 203 re-checks for the presence of slave agent 202 by tristating SCLK line 212 to see if it gets pulled low by slave 202. If so, the master transitions to Recharge state 518 and attempts to recharge or revive the battery associated with slave agent 202. After a period of attempting to recharge the battery (e.g., 10 seconds), state machine 203 returns to Idle state 510.

However, if the signal on SDATA line 214 is in a high state, state machine 203 transitions to Tristate SCLK state 520. In Tristate SCLK state 520, state machine 203 tristates SCLK line 212 and determines whether SCLK line 212 transitions low and whether SDATA line 214 transitions to a low state within a predetermined period of time. In one mode of operation, if SDATA line 214 does not transition to a low state within one-half second of tristating SCLK line 212, or if SCLK line 212 does not transition low, then state machine 203 transitions to Pause state 525.

In Pause state 525, state machine 203 pauses for one second. After pausing for this predetermined amount of time, state machine 203 transitions to Idle state 510 and again attempts to synchronize the agents.

Returning to Tristate SCLK state 520, if SCLK line 212 and SDATA line 214 are determined to be low within the predetermined period of time, state machine 203 transitions to SCLK High state 530. In SCLK High state 530, state machine 203 drives SCLK line 212 to a high state and determines whether SDATA line 214 transitions to a high state within one-half second. If SDATA line 214 does not transition to a high state within one-half second, then state machine 203 transitions to Idle state 510 and attempts synchronization again. However, if SDATA line 214 does transition to a high state within one-half second, then state machine 203 transitions to Delay state 535.

In Delay state 535, state machine 203 pauses for a period of time; in one mode of operation this period is predetermined to be between 10 µs and 50 µs. Both master 201 and slave 202 are preprogrammed with this period of time, so the two agents are synchronized for the data transfer.

Upon expiration of the period of time in Delay state 535, state machine 203 transitions to Data Transfer state 540. In Data Transfer state 540 state machine 203 performs the data transfer. The bits for the transfer are transferred, and state machine 203 returns to Idle state 510. State machine 203 remains in Idle state 510 until a subsequent data transfer needs to be made.

FIG. 6 is a flowchart showing the method followed by slave agent 202 in performing a data transfer in one embodiment of the present invention. The method followed by slave 202 is in response to the actions of master 201; slave 202 does not initiate synchronization for a data transfer.

Slave agent 202 prepares for the synchronization process by first enabling the SIOP by setting the SPE bit, step 600. Slave agent 202 then writes the value $FF_{16}$ to the SIOP data register 276, step 602. Slave agent 202 then clears the SPE bit (thereby placing SIOP 274 into basic I/O mode), step 604, and drives port 260 to output a "1", step 606. Thus, slave agent 202 is ready for a data transfer.

After initializing the SIOP in steps 600–606, slave agent 202 determines whether the signal on SCLK line 213 transitions to a low state, step 608. Master agent 201 initiates synchronization by allowing the signal on SCLK line 213 to transition to a low state, as described above. Thus, slave agent 202 waits for the signal on SCLK line 213 to transition to a low state to synchronize itself with master agent 201. Note that during this period of waiting, slave agent 202 can attend to other tasks.

The transitioning of the signal on the SCLK line 213 to a low state causes slave agent 202 to shift data to latch 277. This data should be a "1" because $FF_{16}$ is stored in register 276. SIOP control logic 281 always shifts data from register 276 to latch 277 on the falling SCLK clock edge. Note, however, that SIOP 274 is still disabled, so this value is not driven onto data_out line 261.

When slave 202 detects the signal on the SCLK line 213 to be in a low state, it responds by driving its data_out line 261 low, step 612. This causes the signal on SDATA line 214 to transition to a low state. Slave 202 then determines whether the signal on SCLK line 212 transitions to a high state within a predetermined period of time, step 614. In one mode of operation, this predetermined period of time is 100 ms.

If the signal on SCLK line 212 does not transition to a high state within this predetermined period of time, then slave 202 enables the SIOP by setting the SPE bit, step 600. Slave 202 then stores $FF_{16}$ into SIOP data register 276, step 602, and disables the SIOP by clearing the SPE bit, step 604. Slave 202 then drives data_out line 261 to "1" at step 606 to tristate SDATA line 214, and returns to step 608 to wait for master 201 to attempt synchronization again.

However, if the signal on SCLK line 212 does transition to a high state within the predetermined period of time, then slave 202 enables the SIOP by setting the SPE bit, step 624. Enabling the SIOP causes the data stored in latch 277 (which should be a "1") to propagate out to data_out line 261 via port 260. The high state of data_out line 261 causes SDATA line 214 to transition to a high state, which indicates to master 201 that slave 202 is ready to perform the data transfer after a predetermined delay. Note that this predetermined delay corresponds to the pause in step 470 of FIG. 4. In one mode of operation, this delay is 10 μs. During this delay, slave 202 prepares for a data transfer by proceeding through steps 626 and 630 or 626 and 628. In addition, slave 202 also starts a timer which limits the time for the length of the data transfer. The use of this timer is described in more detail below.

During the predetermined delay, slave 202 determines whether it is to receive data during the transfer or transmit data, step 626. This determination is based on the command protocol followed by master 201 and slave 202, as discussed above. Note that the actual shifting of data in and out, as seen by SIOP 274, is the same regardless of whether slave 202 is transmitting or receiving. Slave 202, however, operates differently depending on whether it is transmitting or receiving.

The data value slave 202 stores in SIOP data register 276 is determined by whether slave 202 is receiving data in the transfer. If slave 202 is not receiving data, then the data it is transmitting is stored into SIOP data register 276, step 628. However, if slave 202 is receiving data, then slave 202 stores the value $FF_{16}$ into SIOP data register 276, step 630.

The predetermined delay discussed above with reference to step 624 is pre-programmed in both master agent 201 and slave agent 202. Thus, after SDATA line 214 transitions high and both master 201 and slave 202 pause for this predetermined delay, master 201 and slave 202 are synchronized for the data transfer. Whereas master 201 is idle during this pause, slave 202 is busy preparing for the transfer by performing step 628 or 630 and starting the timer mentioned above which limits the time for the data transfer (e.g. 100 μs allotted). Slave 202 then performs a one bit transfer, shifting data out on data_out line 261 on the falling edge of SCLK, and sampling data in on data_in line 256 on the rising edge of SCLK, all in response to the master which is controlling the transitions of SCLK to cause the SIOP to shift data in and out. In this manner, one bit is transferred in one clock cycle, step 634.

Upon completion of a one-bit transfer, slave 202 determines whether the timer has expired, step 636. In one implementation, this timer is 100 μs. If the timer has expired, then slave 202 returns to step 600 to wait for the synchronization process to begin again. If the timer has not expired at step 636, then slave 202 determines whether the SPIF bit is set, step 638. SIOP control logic 281 sets the SPIF bit upon completion of a data transfer (in one mode of operation, this is the size of SIOP data register 276). If the SPIF bit is not set, then slave 202 returns to step 634 for the transfer of another bit.

Returning to step 638, if the SPIF bit is set then slave 202 knows the data transfer is completed. Slave 202 then determines whether it was receiving or transmitting data, step 640. As discussed above with respect to step 626, slave 202 makes this determination based on the command protocol. If slave 202 was transmitting data, then slave 202 returns to step 600 to prepare and wait for the synchronization process to begin again. However, if slave 202 was receiving data, then slave 202 reads SIOP data register 276 and stores the contents in an internal storage location, such as a RAM, step 642. Slave 202 then returns to step 600.

In light of the above discussion, it should be understood by those skilled in the art that either master 201 or slave 202 can attend to other tasks during the synchronization process. As shown above, the synchronization process is asynchronous; at any point during this process, prior to being synchronized, either agent can attend to other, presumably higher priority, tasks. Under certain circumstances, prolonged attention to other tasks can cause the synchronization process to re-start. For example, in one embodiment master 201 will only wait one-half second for slave 202 to drive SDATA line 214 to a low state (step 445 of FIG. 4); if slave 202 is attending to other tasks and does not drive SDATA line 214 low within this one-half second period, then master 201 restarts the synchronization process.

Figure 7:
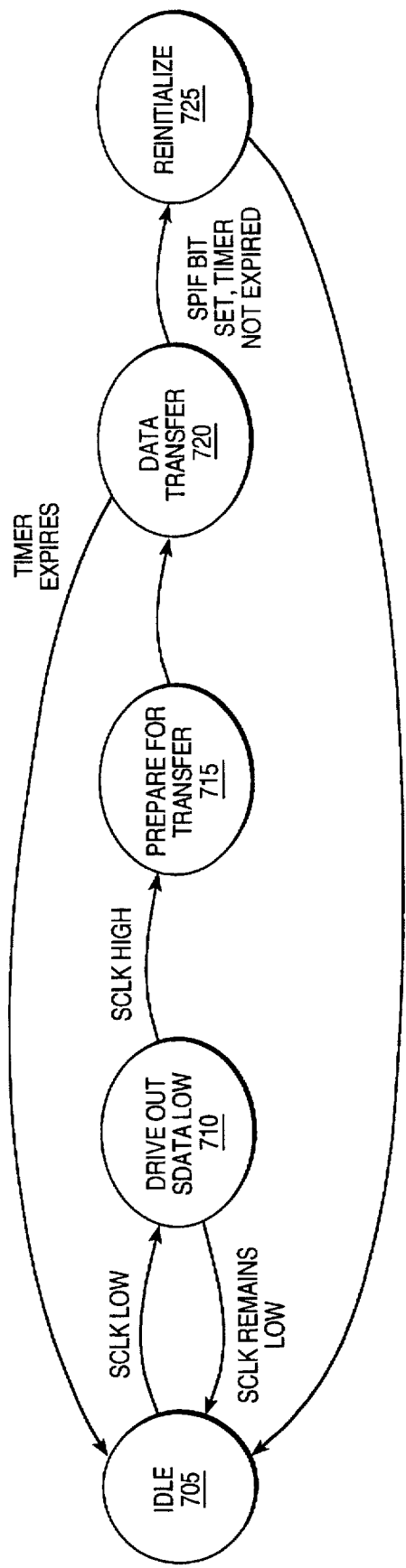
FIG. 7 is a state diagram of a slave state machine used in one embodiment of the present invention.

FIG. 7 is a state diagram of slave state machine 270 of FIG. 2A used in one embodiment of the present invention. State machine 270 follows the method shown in the flowchart of FIG. 6. State machine 270 begins in Idle state 705. State machine 270 remains in Idle state 705 until slave agent 202 detects a low signal on SCLK line 213.

Once a low signal is detected on SCLK line 213, slave 202 transitions to Drive Out SDATA Low state 710. Slave 202 remains in Drive Out SDATA Low state 710 for up to 100 ms. If SCLK line 213 is not detected high within this predetermined period of time, then state machine 270 transitions to Idle state 705. However, if SCLK line 213 is detected high within this predetermined period of time, then state machine 270 transitions to Prepare For Transfer state 715. Note that if slave 202 is not coupled to master 201, the signal on SCLK line 213 on the slave side should never go to a high state.

In Prepare For Transfer state 715, slave 202 prepares for the data transfer. This preparation includes setting the SPE bit, storing the proper values into the SIOP data register, and setting SDATA line 214 high (which occurs when the SIOP is enabled), as described above in FIG. 6.

Upon completion of preparing for the data transfer, slave agent 202 transitions to Data Transfer state 720. In Data Transfer state 720, slave agent 202 performs the data transfer. As described above in FIG. 6, a timer is used during the data transfer. If the timer expires before the transfer is completed (i.e., before the SPIF bit is set), then state machine 270 stops transferring and transitions to Idle state 705. Slave 202 presumes the connection was lost if the timer expires, thus it returns to Idle state 705 to await the beginning of synchronization for another data transfer.

If the transfer is completed before the timer expires, then state machine 270 transitions to Reinitialize state 725. In Reinitialize state 725, slave agent 202 re-initializes itself for another data transfer. The proper values are stored in the SIOP data register and the SPE bit is cleared, as described above. Upon completion of the re-initialization steps, state machine 270 transitions to Idle state 705 for another data transfer.

FIG. 8A is a timing diagram illustrating the operation of one embodiment of the present invention. The SCLK signal 800 is the clock signal transferred from master agent 201 to slave agent 202 via SCLK lines 212 and 213 of FIG. 2A. Similarly, the SDATA signal 810 is the data signal transferred between master agent 201 and slave agent 202 over SDATA lines 214 and 216, data_in line 256, and data_out line 261 of FIG. 2A.

At position 820, both SCLK line 800 and SDATA line 810 are in a high state. When master 201 needs to transfer data, it tristates SCLK line 800, at position 830. SCLK line 800 transitions to a low state at position 830 when slave agent 202 is connected to master agent 201.

At position 840, slave 202 drives data_out line 261 low in response to observing SCLK line 800 transition to a low state. Having seen the SDATA line 810 transition low, master 201 drives SCLK line 800 high, at position 850. Slave 202 enables SIOP 274 which drives data_out line 261 high (since a "1" was already in latch 277) at position 860 in response to SCLK 800 transitioning high at position 850.

At this point, master 201 and slave 202 are synchronized. Both expect SCLK 800 to transition low for the first clock cycle of the data transfer a predetermined period of time after SDATA 810 transitions high at 860. In one mode of operation, this period of time is 10 µs. The eight-bit data transfer, most significant bit first, is then performed.

At the completion of the data transfer, master agent 201 stops clocking on SCLK line 800, drives SCLK line 800 to a high state, and tristates SDATA line 810 at position 880. Master agent 201 pauses for a predetermined period of time before attempting another data transfer by tristating SCLK line 800 at position 830 again. In one mode of operation, this predetermined period of time is 50 µs.

FIG. 8B is the timing diagram of FIG. 8A showing timing specifications for one embodiment of the present invention. Table 1 below shows exemplary timing specifications for the timing diagram of FIG. 8B.

TABLE 1

| Description | Symbol | Min. | Max. | Units |
| --- | --- | --- | --- | --- |
| SCLK clock frequency | freq | | 440 | kHz |
| SCLK LOW time | t$_{LO}$ | 1.14 | | µs |
| SCLK HIGH time | t$_{HI}$ | 1.14 | | µs |
| SCLK and DATA rise or fall time | t$_{R,F}$ | | 0.5 | µs |
| SPIF HIGH to DATA tristate | t$_1$ | | 100 | µs |
| SCLK LOW to DATA low (before resync. occurs) | t$_2$ | | 500 | ms |
| DATA LOW to SCLK HIGH (before resync. started) | t$_3$ | | 100 | ms |
| SCLK HIGH to DATA HIGH (before resync. started) | t$_4$ | | 500 | ms |
| DATA HIGH to SHIFT Start (resync. started if t$_5$ > max) | t$_5$ | 10 | 50 | µs |
| Data Byte Transfer Time (8 bits) | t$_6$ | 20 | 100 | µs |

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims, which in themselves recite only those features regarded as essential to the invention.

Thus, a method and apparatus for providing a high throughput two-conductor serial interface with support for slave device detection has been described.

What is claimed is:

1. A system for transferring data between a master agent and a slave agent, said system comprising:

a first signal conveyance medium for transferring a clock signal from said master agent to said slave agent, said clock signal having a falling edge and a rising edge, said first signal conveyance medium including a first portion removably coupled to a second portion, first signal conveyance medium including circuitry for automatically pulling first signal conveyance medium to a first predetermined state when said first portion is coupled to said second portion and for automatically pulling first signal conveyance medium to a second predetermined state when said first portion is not coupled to said second portion;

a second signal conveyance medium for serially transferring data between said master agent and said slave agent;

said master agent being coupled to said first portion of first signal conveyance medium and said second signal conveyance medium, said master agent being configured to detect the first portion of the first signal conveyance medium being coupled to the second portion based on whether the first signal conveyance medium is automatically pulled to said first predetermined state or said second predetermined state;

said slave agent being coupled to said second portion of first signal conveyance medium and said second signal conveyance medium, said slave agent only receiving said clock signal, said slave agent including an input port for retrieving first data from said second signal conveyance medium on the rising edge of said clock signal and an output port for placing second data onto said second signal conveyance medium on the falling edge of said clock signal; and a circuit coupled to said second signal conveyance medium and said output port, said circuit allowing said input port and said output port to share said second signal conveyance medium.

2. The system as defined in claim 1 wherein said slave agent further includes a shift register, said shift register storing said first data and said second data.

3. The system as defined in claim 1 wherein said circuit is an open collector device.

4. The system as defined in claim 1 wherein said second signal conveyance medium includes a third portion removably coupled to a fourth portion such that said slave agent and said master agent can be disconnected.

5. The system as defined in claim 1 wherein said circuitry includes a voltage source coupled to said first portion through a high impedance resistor and a ground source coupled to said second portion through a low impedance resistor.

6. The system as defined in claim 4 wherein a ground source is coupled to said third portion through a high impedance resistor and a voltage source is coupled to said fourth portion through a low impedance resistor.

7. The system as defined in claim 1 wherein said master agent includes control logic for:

determining whether the signal on said second signal conveyance medium is high or low;

tristating said first signal conveyance medium;

determining whether the signal on said first signal conveyance medium transitions low;

driving said first signal conveyance medium to a high state; and determining whether the signal on said second signal conveyance medium transitions high in response to said driving.

8. The system as defined in claim 1 wherein said slave agent includes control logic for:

determining whether the signal on said first signal conveyance medium transitions from a high state to a low state;

driving said second signal conveyance medium to a low state; and determining whether the signal on said first signal conveyance medium transitioned from a low state to a high state.

9. A method for synchronizing a computer system for serial communication with a power source using a first signal conveyance medium and a second signal conveyance medium, said power source being removably coupled to said computer system, said first signal conveyance medium for transferring said data and said second signal conveyance medium for transferring a clock signal, said method comprising the steps of:

(a) determining automatically whether the signal on said first signal conveyance medium is pulled to a first state or a second state; and (b) determining said computer system is not coupled to said power source in response to the signal on said first signal conveyance medium being in said first state, otherwise synchronizing said computer system for transferring data serially to said power supply by,
 (1) tristating said second signal conveyance medium,
 (2) determining whether the signal on said second signal conveyance medium transitions low,
 (3) driving said second signal conveyance medium to a high state, and
 (4) determining whether the signal on said first signal conveyance medium transitions high in response to said driving.

10. The method as defined in claim 9 wherein said step (b)(2) comprises determining whether said signal on said second signal conveyance medium transitions low within a predetermined period of time after said tristating.

11. The method as defined in claim 9 wherein said step (b)(2) comprises repeating said steps (a) through (b)(1), provided said second signal conveyance medium remains in a high state for a predetermined period of time after said tristating.

12. The method as defined in claim 9 wherein said step (b)(4) comprises determining whether the signal on said first signal conveyance medium transitions high in response to said driving within a predetermined period of time after said driving.

13. The method as defined in claim 9 wherein said step (b)(4) comprises repeating steps (a) through (b)(3), provided said first signal conveyance medium remains in a low state within a predetermined period of time after said driving.

14. A method for synchronizing a first agent for transferring data serially to a second agent using a first signal conveyance medium and a second signal conveyance medium, said first and second agent being removably coupled together, said first signal conveyance medium for transferring said data and said second signal conveyance medium for transferring a clock signal, said method comprising the steps of:

(a) determining automatically whether the signal on said second signal conveyance medium is pulled to a first state or a second state; and (b) determining said first agent is not coupled to said second agent in response to the signal on said first signal conveyance medium being in said first state, otherwise synchronizing the first agent for transferring data serially to the second agent by,
 (1) determining whether the signal on said second signal conveyance medium transitions from a high state to a low state;
 (2) driving said first signal conveyance medium to a low state; and
 (3) determining whether the signal on said second signal conveyance medium transitioned from a low state to a high state.

15. The method as defined in claim 14, further comprising the step of determining whether said first agent is receiving data or sending data.

16. The method as defined in claim 15, further comprising the step of storing the data to be transferred into a data register if said first agent is sending data and storing a value of $FF_{18}$ into said data register if said first agent is receiving data.

17. The method as defined in claim 14 wherein said step (b)(2) comprises determining whether the signal on said second signal conveyance medium transitioned from a low state to a high state within a predetermined period of time after said driving.

18. The method as defined in claim 14 wherein said step (b)(2) comprises repeating said steps (b)(1) and (b)(2) if said second signal conveyance medium remains low for a predetermined period of time.

19. A method for transferring data serially between a first agent and a second agent using a first conductor and a second conductor, said first conductor having a first portion and a second portion removably connected by a first connector, said second conductor having a third portion and a fourth portion removably connected by a second connector, said first agent being coupled to said first portion and said third portion, said second agent being coupled to said second portion and said fourth portion, said first conductor for transferring said data and said second conductor for transferring a clock signal, said method comprising the steps of:

(a) synchronizing said first agent and said second agent, said synchronizing including,
 determining automatically whether the signal on said first conductor is pulled to a first state or a second state,
 determining automatically whether the signal on said second conductor is pulled to the first state or the second state,
 determining both that said first portion and said second portion are not coupled together and that said third portion and said fourth portion are not coupled together in response to both said signal on said first conductor being in said first state and said signal on said second conductor being in said second state, otherwise,
  re-charging a battery associated with the second agent;
 tristating said second conductor,
 determining whether the signal on said second conductor transitions low,
 driving said second conductor to a high state, and
 determining whether the signal on said first conductor transitions high in response to said driving;

(b) driving said clock signal onto said second conductor;

(c) issuing signals representative of said data onto said first conductor;

(d) stopping said driving said clock signal onto said second conductor; and (e) pausing for a predetermined period of time.

20. A method for transferring data serially between a computer system and a power source using a first conductor and a second conductor, said first conductor having a first portion and a second portion removably connected by a first connector, said second conductor having a third portion and a fourth portion removably connected by a second connector, said computer system being coupled to said first portion and said third portion, said power source being coupled to said second portion and said fourth portion, said first conductor for transferring said data and said second conductor for transferring a clock signal, said method comprising the steps of:

(a) synchronizing said power source to said computer system, said synchronizing including, determining automatically whether the signal on said first conductor is pulled to a first state or a second state, determining automatically whether the signal on said second conductor is pulled to the first state or the second state, determining both that said first portion and said second portion are not coupled together and that said third portion and said fourth portion are not coupled together in response to both said signal on said first conductor being in said first state and said signal on said second conductor being in said second state, otherwise, re-charging said power source;

determining whether the signal on said second conductor transitions from a high state to a low state, driving said first conductor to a low state, and determining whether the signal on said second conductor transitioned from a low state to a high state;

(b) issuing signals representative of said data onto said first conductor for a period of time; and (c) setting an interrupt bit upon completion of said issuing of said signals.

21. The method as defined in claim 20, wherein said step (c) comprises repeating steps (a) and (b) if said interrupt bit is not set within a predetermined amount of time.

22. The method as defined in claim 20, further comprising the step of storing said data in a storage device.

23. The method as defined in claim 20, further comprising the step of preparing said power source for a subsequent data transfer.

24. The method as defined in claim 20, further comprising repeating steps (a) through (c) for a subsequent data transfer.

25. The method as defined in claim 20, further comprising the step of determining whether said computer system is receiving data or sending data.

26. The method as defined in claim 25, further comprising the step of storing the data to be transferred into a data register if said computer system is sending data and storing a value of $FF_{16}$ into said data register if said computer system is receiving data.

27. A system for communicating information between a computer system and a power source, the system comprising:

a first signal conveyance medium for transferring a clock signal from the computer system to the power source, the first signal conveyance medium including a first portion removably coupled to a second portion, and circuitry for automatically pulling the first signal conveyance medium to a first predetermined state when the first portion is coupled to the second portion and for automatically pulling the first signal conveyance medium to a second predetermined state when the first portion is not coupled to the second portion;

a second signal conveyance medium supporting serial communication between the computer system and the power source;

wherein the computer system is coupled to the first portion of the first signal conveyance medium and the second signal conveyance medium, and wherein the computer system is configured to detect whether the power source is coupled to the computer system based on whether the first signal conveyance medium is pulled to the first predetermined state;

wherein the power source is coupled to the second portion of the first signal conveyance medium and the second signal conveyance medium, and wherein the power source includes an input port for retrieving first data from the second signal conveyance medium, and an output port for placing second data on the second signal conveyance medium; and a circuit, coupled to the second signal conveyance medium and the output port, which allows the input port and the output port to alternately share the second signal conveyance medium to support serial communication with the computer system.

* * * * *